Patented May 2, 1950

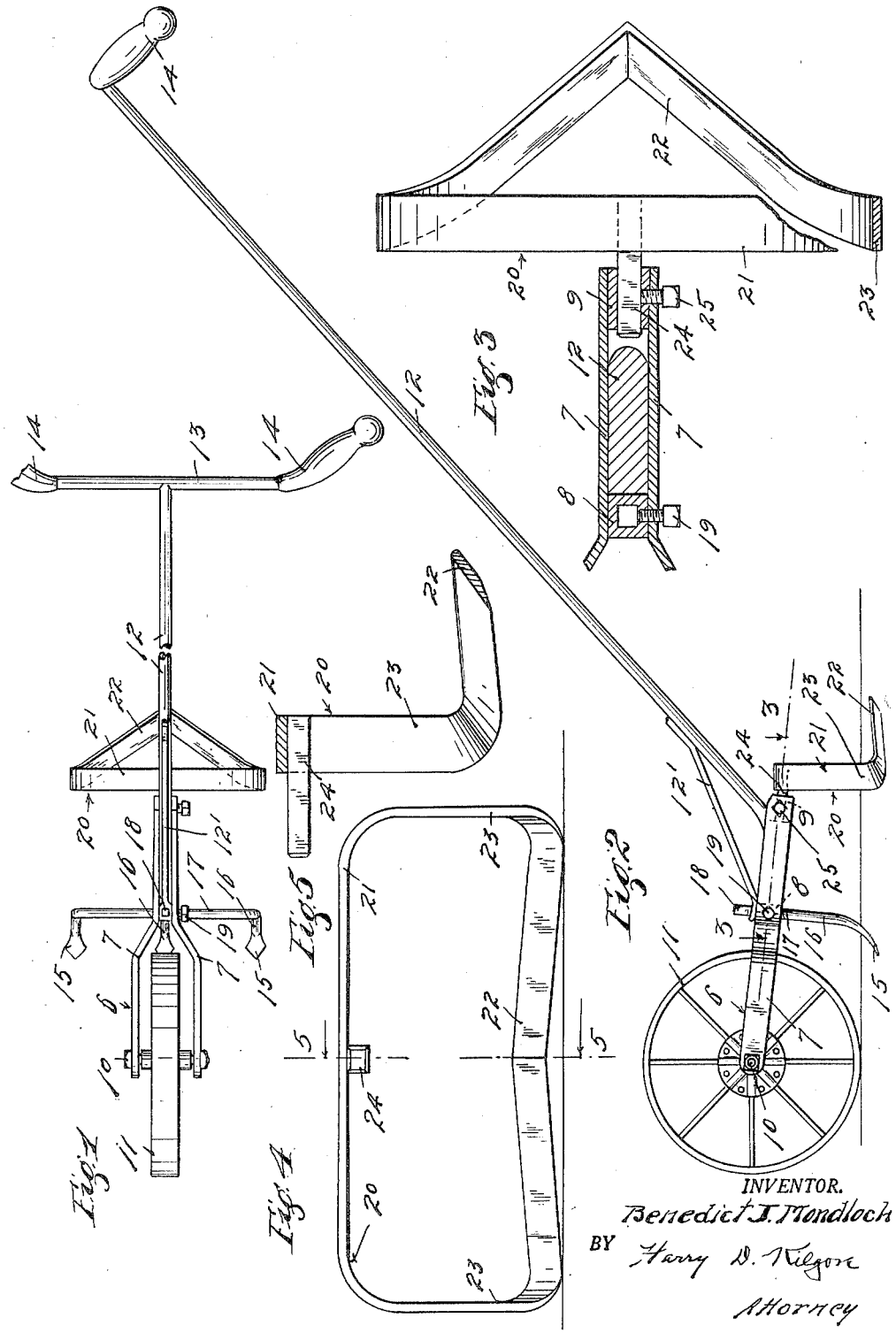

2,506,033

UNITED STATES PATENT OFFICE 2,506,033

WEEDER AND CULTIVATOR

Benedict J. Mondloch, St. Martin, Minn., assignor of one-half to Adolph J. Zackman and one-half to Joseph E. Hayes, both of Minneapolis, Minn.

Application October 18, 1946, Serial No. 704,212

1 Claim. (Cl. 97—59)

My present invention relates to improvements in agricultural implements and more particularly to hand operated wheeled garden weeders and cultivators.

The principal objects of this invention are, to provide a highly efficient agricultural implement that first breaks up the soil by means of cultivator teeth and then by means of a novel knife, that first cuts a slice of the soil and then produces therein a wave like action that thoroughly pulverizes and aerates the same, shakes the dirt from weed roots, so that they will wither and die and at the same time acts as a guard for plants as the implement is pushed past the same.

The faster the implement is pushed the greater will be the agitation of the soil and in some soil conditions it will be turned over.

Other objects of the invention will be apparent from the following description, reference being had to the drawing.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is a plan view;

Fig. 2 is an elevational view;

Fig. 3 is a fragmentary detail view partly in plan and partly in horizontal section taken on the line 3—3 of Fig. 2, on an enlarged scale;

Fig. 4 is a front elevation of the knife as shown in Fig. 3 and removed from the implement, and Fig. 5 is a sectional view taken on the line 5—5 of Fig. 4.

The numeral 6 indicates a main frame comprising a pair of horizontally disposed side bars 7. These side bars are rigidly connected by a vertically disposed front socket member 8 and a horizontally disposed rear socket member 9. These socket members 8 and 9 extend between the side bars 7, act as spacers and are welded thereto. The side bars 7, forward of the front socket member 8 are further laterally spaced apart.

An axle 10, in the form of a nut equipped bolt, extends through aligned holes in the front end portions of the side bars 7. A ground wheel 11 is journaled on the axle 10 between the side bars 7. The implement is pushed by means of a handle 12 in the form of a round rod, having on its outer end a transverse handle bar 13, having rubber hand grips 14. The front end portion of the handle 12 extends between the side bars 7 and the socket members 8 and 9 and is welded to said side bars and socket members. A brace 12' connects the handle 12 to the socket member 8.

Just back of the wheel 11 are three laterally spaced cultivator teeth 15 the shank 16 of which are integral with or rigidly secured to a horizontal bar 17 that extends transversely of the implement. This bar 17 has at its longitudinal center an upstanding square shank 18 removably mounted in the socket member 8. A set-screw 19 having threaded engagement with one of the side bars 7 and the socket member 8 impinges the shank 18 and holds the same in said socket.

Rearwardly of the cultivator teeth 15 is a novel cutter 20 that extends transversely of the implement. This cutter 20 includes a yoke-like member 21 and a blade 22. The blade 22 extends between the depending arms 23 of the member 21 and its ends are integral with the lower ends of said arms. A square shank 24 rigidly secured to the member 21 at its longitudinal center, extends forwardly thereof and into the socket member 9. The shank 24 is rigidly and removably held in the socket member 9 by a set-screw 25 that has threaded engagement with the socket member.

The blade 22 is in the form of a horizontally disposed V. This blade 22 transversely, is upwardly and rearwardly inclined and the front or cutting edge thereof is sharp. The diverging members of the blade 22 are upwardly and rearwardly inclined so that the crotch of the blade 22 is higher than the outer ends of said members. The V cutting edge of the blade 22 is highly important in that it produces a shearing action on weeds while a straight blade simply pushes the weeds over and passes over the same.

The blade 22 cuts a ribbon like layer of soil and as the transversely inclined blade 22 passes under the soil it produces a wave like movement of the soil which breaks the same up and pulverizes and aerates it at the same time. Pushing the implement fast will materially increase the agitation of the soil. The corners formed by the blade 22 and the arms 23 are rounded to prevent dirt from lodging therein. The rearward inclination of the blade 22 tends to draw said blade into the ground and thereby cut at a constant depth.

The arms 23 act as a guard to prevent damage to plants by the implement as it is pushed past the same.

From what has been said, it will be understood that the invention described is capable of modifications as to details of construction, arrangement and combination of parts within the scope of the invention herein disclosed and claimed.

What I claim is:

In an implement of the class described, a frame including a pair of horizontally disposed laterally spaced side bars, a ground wheel journaled to and between the side bars at their front end portions, a front vertically disposed socket member and a rear horizontally disposed socket member interposed between the side bars, a push rod having at one end a handle and its other end portion being inserted between the side bars and between the front and rear socket members, said socket members and push rod affording spacers for the side bars and rigidly secured thereto, a plurality of connected cultivator teeth having an upstanding shank mounted in the front socket member, and a cutter formed of a single flat bar and comprising a yoke-like member and a rearwardly extended V blade, said yoke-like member having on its top section at its longitudinal center a forwardly projecting horizontal shank mounted in the rear socket member, the sections of the blade being transversely inclined, the apex of the blade being higher than the end portions thereof and the corners of the cutter at the outer ends of the blade being inclined and rounded.

BENEDICT J. MONDLOCH.

REFERENCES CITED

The following references are of record in the file of this patent:

UNITED STATES PATENTS

| Number | Name | Date |
|---|---|---|
| 290,142 | Thompson | Dec. 11, 1883 |
| 773,070 | Fuller | Oct. 25, 1904 |
| 1,040,325 | Hilton | Oct. 8, 1912 |
| 1,412,614 | Huston | Apr. 11, 1922 |
| 1,413,509 | Walsh | Apr. 18, 1922 |
| 1,633,232 | Sievers | June 21, 1927 |
| 1,648,738 | Mills | Nov. 8, 1927 |
| 1,966,536 | Bevis | July 17, 1934 |
| 2,014,055 | Tempel et al. | Sept. 10, 1935 |
| 2,387,748 | Cuddigan et al. | Oct. 30, 1945 |